United States Patent [19]

Fujimoto

[11] Patent Number: 4,941,055
[45] Date of Patent: Jul. 10, 1990

[54] RECORDING APPARATUS WITH IMPROVED S/N RATIO

[75] Inventor: Ryo Fujimoto, Kanagawa, Japan

[73] Assignee: Canon Kabushiki Kaisha, Tokyo, Japan

[21] Appl. No.: 129,991

[22] Filed: Dec. 8, 1987

[30] Foreign Application Priority Data

Dec. 9, 1986 [JP] Japan .............................. 61-291495
Dec. 9, 1986 [JP] Japan .............................. 61-291496
Dec. 9, 1986 [JP] Japan .............................. 61-291497

[51] Int. Cl.$^5$ ............................................. H04N 5/782
[52] U.S. Cl. .................................... 358/340; 358/330; 360/22; 360/30; 360/33.1
[58] Field of Search ............... 360/22, 29, 30, 33.1, 360/35.1; 358/166, 167, 330, 310, 335, 340

[56] References Cited

U.S. PATENT DOCUMENTS 4,654,724  3/1987  Nagano .............................. 358/310
4,668,997  5/1987  Nagano et al. .................. 358/330 X
4,779,133  10/1988  Sugimori ........................... 358/167

Primary Examiner—Robert L. Richardson
Attorney, Agent, or Firm—Robin, Blecker, Daley & Driscoll

[57] ABSTRACT

An information signal recording apparatus for recording an information signal having a predetermined frequency band onto a recording medium, which comprises signal separating means for receiving said information signal and for separating the received information signal into a first signal having a first frequency band and a second signal having a second frequency band which is higher than said first frequency band and outputting said first and second signals; first recording means for forming a frequency-modulated first signal by frequency-modulating the first signal outputted from said signal separating means and for recording said frequency-modulated first signal onto a first area of said recording medium; and second recording means for forming a frequency-modulated second signal, which is interleaved relatively to said frequency-modulated first signal, by frequency-modulating the second signal outputted from said signal separating means and for recording said frequency-modulated second signal onto a second area of said recording medium which is different from said first area.

14 Claims, 12 Drawing Sheets

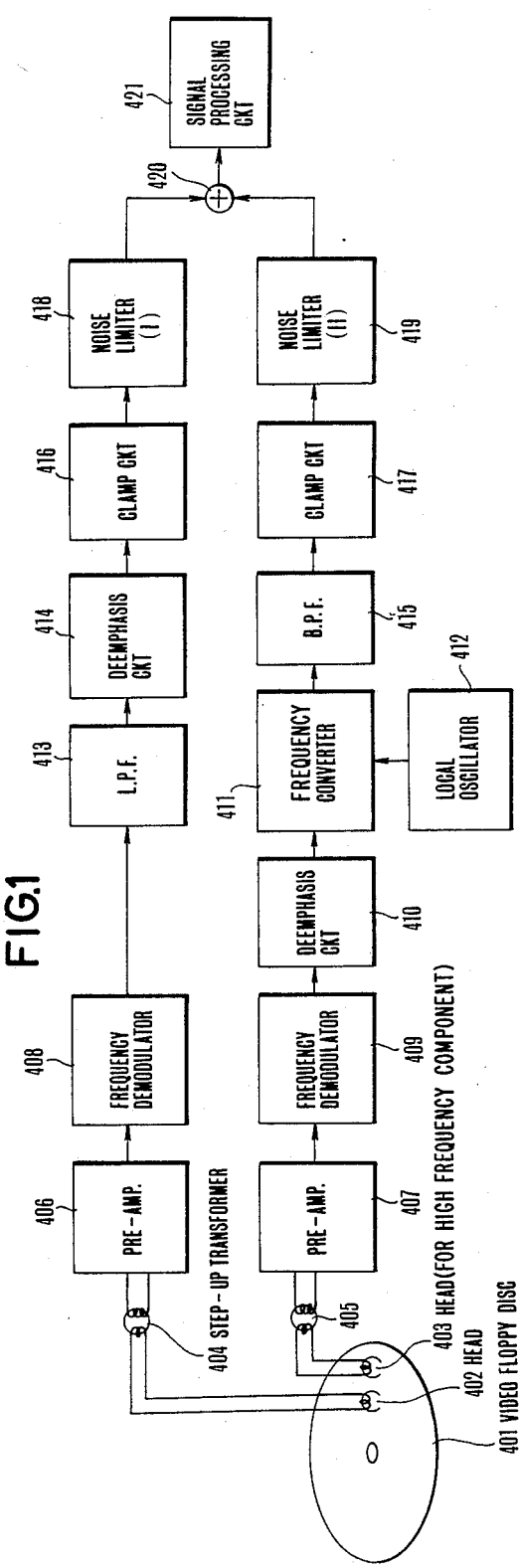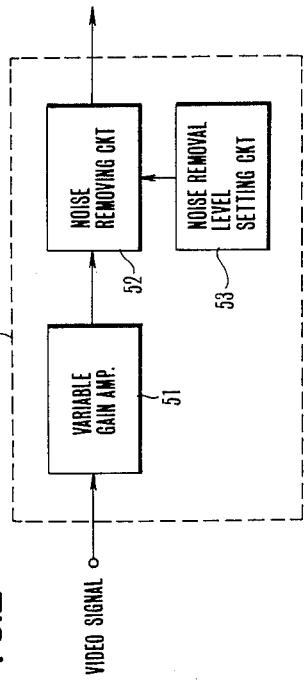

––– · ––– REFERENCE LINE

───── RECORDING PATTERN DEVIATED 14μm
TO THE LEFT

– – – – – RECORDING PATTERN DEVIATED 14μm
TO THE RIGHT

RECORDING APPARATUS WITH IMPROVED S/N RATIO

BACKGROUND OF THE INVENTION

1. Field of the Invention

This invention relates to an information signal recording apparatus for recording an information signal having a wide frequency band onto a recording medium.

DESCRIPTION OF THE RELATED ART

The luminance signal component of a TV signal has been prescribed to have a frequency band of about 4.2 MHz. Meanwhile, as a result of decrease in cost of semiconductor memories, it has recently come to be practiced to minimize a flicker and to increase vertical resolution by converting scanning lines in such a way as to change an interlaced picture plane into a non-interlaced picture plane.

However, although the vertical resolution can be increased by this, there arises an unbalanced state between the horizontal and vertical resolutions, because the band of 4.2 MHz which defines the horizontal resolution has not been determined relative to the vertical resolution obtained in the case of interlacing arrangement.

To eliminate this unbalance, efforts have become active to raise the frequency band up to 6 MHz or thereabout. These effects include, for example, a movement for EDTV (extended definition television). In the case of EDTV, in order to retain interchangeability with the signals to be handled by the conventional transmission method, a transmission system is arranged, for example, to separate only a high frequency component which has frequencies, for example, from 4 to 6 MHz and to frequency interleave and multiplex transmit the component thus separated.

It is also being contemplated for a still picture recording/reproducing system, such as a still video system which requires a high degree of definition in particular, to record a high frequency component and a low frequency component separately on a recording medium.

FIG. 5 of the accompanying drawings is a circuit diagram showing the reproduction system of the above stated still video system. As shown, the conventional system has been arranged in to reproduce the general low frequency component and the high frequency component separately from each other and then to add them together before various signal processing operations.

The arrangement of FIG. 5 simplifies the circuit arrangement as it requires only a single signal processing circuit 22. On the other hand, however, the conventional system is disadvantageous for removing noises. According to this arrangement, the noise removal must be carried out by firstly removing the noise in the high frequency component and then removing the noise in the combined signal including the high frequency component and the low frequency component. Therefore, the conventional system either has complicated the signal processing operation or greatly degraded the resolution of the picture.

The still video systems have unified standards already established for them. In accordance with the standards, a still video system is allowed to record and reproduce a luminance signal of a frequency band up to 4.5 MHz. However, this value 4.5 MHz (more exactly stated, 4.2 MHz in the case of the NTSC color system) has been determined by the NTSC on the assumption of recording and reproduction of a motion picture. Hence, this value is not apposite to recording and reproduction of a still picture.

Further, as mentioned in the foregoing, the non-interlacing arrangement for TV receiver which has been prompted by the recent improvement in the performance of semiconductor memories has come to result in an increase in the vertical resolution which now presents a problem with respect to the unbalance of the horizontal resolution relative to the increased vertical resolution.

SUMMARY OF THE INVENTION

It is therefore an object of this invention to provide an information signal recording apparatus which is arranged to improve the S/N ratio of an information signal.

It is another object of this invention to provide a recording apparatus which is arranged not only to eliminate the shortcoming of the above stated conventional apparatus but also to have interchangeability, for example, with the existing still video systems.

To attain this object, an embodiment of this invention comprises (A) signal separating means for receiving an information signal and for separating the received information signal into a first signal having a first frequency band and a second signal having a second frequency band which is higher than said first frequency band and outputting said first and second signals;

(B) first recording means having a first magnetic head to record the first signal outputted from said signal separating means onto a first area of said magnetic recording medium by said first magnetic head; and (C) second recording means having a second magnetic head, which is different in its azimuth angle of gap from said first magnetic head, to record the second signal outputted from said signal separating means onto a second area of said magnetic recording medium, which is different from said first area.

According to this embodiment, it is possible to record a signal of a first frequency band of the information signal onto a first area of the recording medium and to record a signal of a second frequency band of said information signal onto a second area of the recording medium, without causing cross-talk.

Another embodiment of this invention comprises:

(A) signal separating means for receiving an information signal and for separating the received information signal into a first signal having a first frequency band and a second signal having a second frequency band which is higher than said first frequency band and outputting said first and second signals;

(B) first recording means for forming a frequency-modulated first signal by frequency-modulating the first signal outputted from said signal separating means and for recording said frequency-modulated first signal onto a first area of said recording medium; and (C) second recording means for forming a frequency-modulated second signal, which is interleaved relatively to said frequency-modulated first signal, by frequency-modulating the second signal outputted from said signal separating means and for recording said frequency-modulated second signal onto a second area of said recording medium which is different from said first area.

According to this invention, it is possible to frequency-modulate a signal of a first frequency band of the information signal and record the frequency-modulated signal onto a first area of a recording medium and to frequency-modulate a signal of a second frequency band of said information signal into a signal which is interleaved with said frequency-modulated signal of the first frequency band to record the frequency-modulated signal onto a second area of said recording medium, thereby avoiding occurrence of mutual adverse affects owing to cross-talk between the signals recorded on said first area and on said second area.

The above and further objects and features of the invention will become apparent from the following detailed description of embodiments thereof taken in connection with the accompanying drawings.

BRIEF DESCRIPTION OF THE DRAWINGS

FIG. 1 is a block diagram showing the arrangement of a still video signal reproducing apparatus arranged according to this invention as a first embodiment thereof.

FIG. 2 is a block diagram showing the details of a noise limiter included in FIG. 1.

DETAILED DESCRIPTION OF THE PREFERRED EMBODIMENTS

Figure 3:
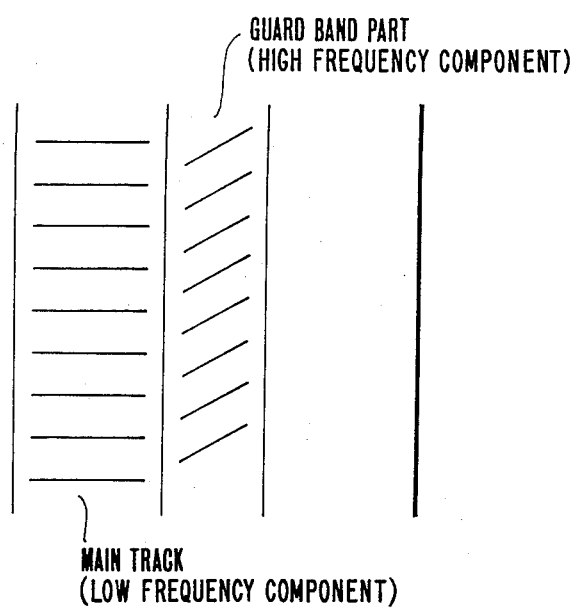
FIG. 3 shows a manner in which signals are recorded on a video floppy disc.

This invention will be more fully understood through the following detailed description of preferred embodiment thereof: FIG. 1 shows the whole arrangement of a video signal reproducing apparatus embodying this invention as a first embodiment thereof. The illustration includes a video floppy disc 401; a reproducing head 402; a reproducing head 403; step-up transformers 404 and 405; pre-amplifiers 406 and 407; frequency demodulators 408 and 409; a deemphasis circuit 410; a frequency converter 411 which is arranged to perform conversion to a high frequency band; a local oscillator 412; a low-pass filter (LPF) 413; a deemphasis circuit 414; a band-pass filter (BPF) 415; clamp circuits 416 and 417; first and second noise limiters 418 and 419 which are arranged to have different noise removing characteristics; an adder 420; and a signal processing circuit 421.

FIG. 2 shows in a block diagram the details of the noise limiter 418 or 419. The limiter includes a variable gain amplifier 51; a noise removing circuit 52 which is arranged to cut off a signal component below a noise removing level; and a noise removal level setting circuit 53 which is arranged to set the above stated noise removing level. Both the noise limiters 418 and 419 of FIG. 1 are arranged as shown in FIG. 2. However, they differ in the setting value of the noise removing level.

The video floppy disc 401 is arranged to have high frequency component and low frequency component recorded thereon with the high frequency component azimuth recorded within a guard band part thereof separately from the low frequency component. More specifically, with the frequency 4 MHz of a luminance signal set as a boundary, a luminance signal component below 4 MHz (or low frequency component) and a color signal are recorded in the same manner as in the ordinary still video recording system on one hand. On the other, a luminance signal component within the range from 4 to 6 MHz (or high frequency component) is first low frequency hand converted by means of a suitable locally oscillated frequency and then is frequency modulated after a suitable emphasizing process. After these processes, the high frequency component is azimuth recorded within the guard band part as shown in FIG. 3.

The noise limiters 418 and 419 which are carrying out an essential function according to this invention are further described as follows: Each of the noise limiters removes a signal below a certain level by regarding it as a noise. However, the amplitude level of the signal generally decreases according as the frequency of the signal increases. Therefore, if the noise removing level is set at a high level, the noise limiter would remove even a high frequency component of the signal. In that event, the noise removal would result in an image having insufficient sharpness. Since the noise of high frequency is not conspicuous, it is rather preferable to have the noises of a high frequency region not completely removed. In the light of this, while the first noise limiter 418 which is provided for the low frequency component is arranged to have the noise removing level set at a relatively high level, the second noise limiter 419 which is for the high frequency component is arranged to have the noise removing level set either at a low level or even at a zero level. With the noise limiters arranged in this manner, the S/N ratio of the signal as a whole is greatly improved by removing the conspicuous noises in the intermediate frequency region of the signal while the noises in the high frequency region thereof is not much removed or not removed at all, so that an image of a high definition can be obtained.

Figure 5:
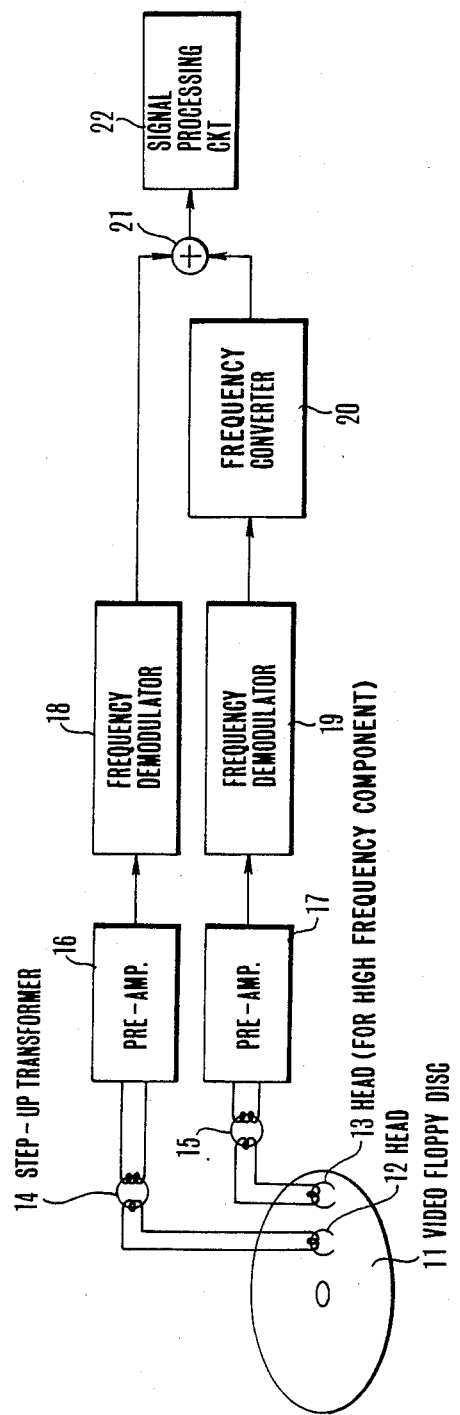
FIG. 5 is a diagram showing the arrangement of the conventional apparatus.

As apparent from comparison between the embodiment of the invention shown in FIG. 1 and the example of the conventional apparatus shown in FIG. 5, the above stated advantage is attainable by the mere addition of another noise limiter. The embodiment, therefore, incurs little increase in the cost of manufacture.

Further, in cases where the low frequency component and the high frequency component have been subjected to pre-emphasizing processes of the same characteristic, the noise removing and adding (combining) processes may be carried out before a deemphasizing process. Further, even in case that the pre-emphasizing process of the same characteristic is not performed on the low frequency component and the high frequency component, the noise limiters may be still disposed before a deemphasis circuit.

Figure 4:
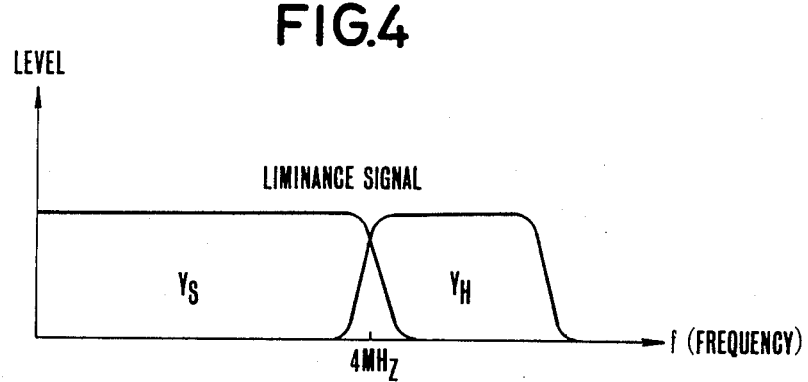
FIG. 4 shows the frequency band of a luminance signal to be handled by the first embodiment.

The variable gain amplifier 51 which is included in each of the noise limiters permits adjustment to a suitable value of a ratio in which luminance signal components YS and YH are added together by changing the gain of the amplifier 51 (see FIG. 4).

In the foregoing, the embodiment is described with reference to FIGS. 1 to 4 as being arranged to perform field recording. However, the embodiment can be arranged in exactly the same manner also for frame recording.

While the embodiment has been described as being arranged to reproduce image information signal recorded on the magnetic recording medium, this invention is of course likewise applicable to a case where a video signal is to be transmitted. Further, while the invention has been described as applied to a still video system, the signal processing operation can be likewise carried out also for moving pictures in accordance with the invention.

Since the first embodiment of this invention is arranged to perform the noise removing process on the low frequency component and the high frequency component separately from each other, the embodiment is capable of improving the S/N ratio and giving a picture of a high degree of definition.

Figure 8:
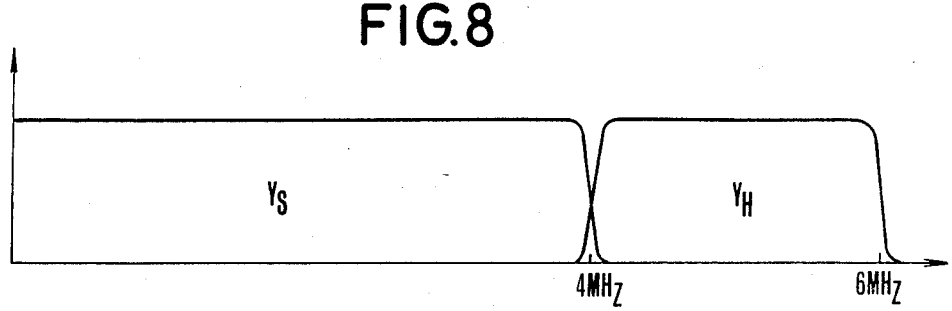
FIG. 8 shows an example of a division of a frequency band of a video signal.
Figure 9:
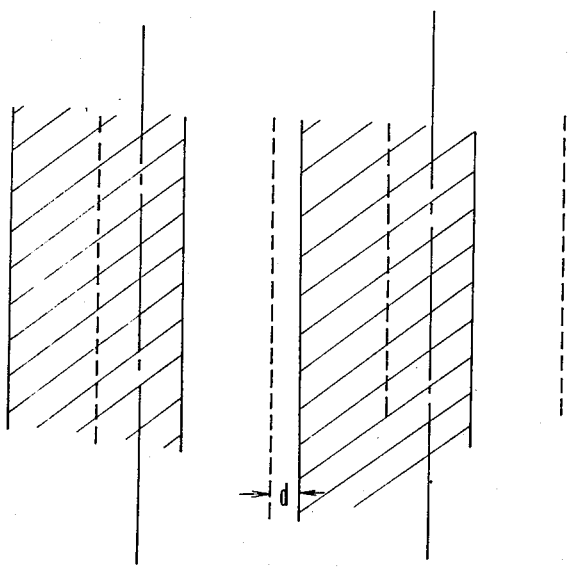
FIG. 9 illustrates a state where a head is located at a most deviated position relative to a track on a magnetic disc.

A second embodiment of this invention is arranged as follows: The second embodiment is fundamentally arranged to have a luminance signal which is of a frequency band up to 6 MHz into two at about 4 MHz and to have high frequency component (luminance signal) of a band from 4 to 6 MHz azimuth recorded in a guard band part of a disc-shaped recording medium (i.e. a magnetic disc). FIG. 8 illustrates an example of division of a frequency band of the luminance signal. The high frequency component. YH is recorded in the guard band part of the magnetic disc by frequency converting and frequency modulating it. In this instance, it is necessary to take head to the following points for interchangeability with the conventional still video system: (1) cross-talk between adjacent tracks and (2) the S/N ratio of the high frequency component signal. These two points must be arranged to be compensable within the range of mechanical precision of the conventional or existing still video system. The condition for meeting this requirement is as follows:

In accordance with the standard specifications currently prevalent, the maximum degree of track deviation is ±14 μm. Referring to FIG. 9, in azimuth recording the high frequency component in the guard band part of the magnetic disc, the position of the head deviates farthest on one side in the worst case. In reproduction, the head position deviates farthest on the other side. Therefore, as indicated by a part d in FIG. 9, the overlapped part of the azimuth recording within the guard band part is 12 μm.

Figure 10:
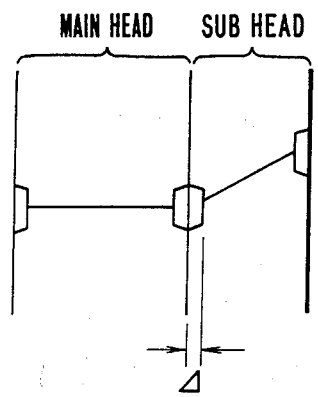
FIG. 10 shows the arrangement of a head part.

In the actual preparation of a head having an azimuth angle of a Read gap, it is necessary to have some parts Δ on both sides of the head gap as shown in FIG. 10. Assuming that the part Δ measures about several μm to 8 μm, the distance of the above stated overlapped part d becomes 4 to 10 μm. In other words, the azimuth recording width, that is, the width of a recordable part in the direction perpendicular to the guard band part is $-8\times 2$ (max. $\Delta\times 2$)=24 μm to 40 μm.

Figure 11:
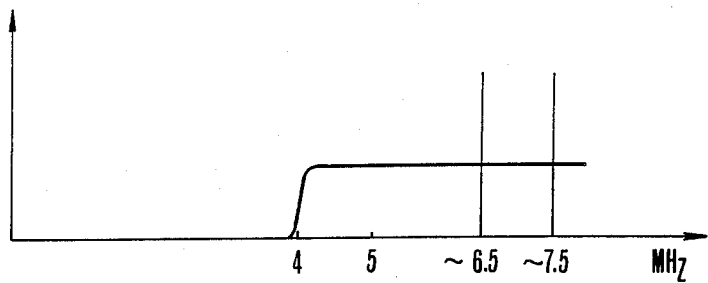
FIG. 11 shows a frequency allocation where a high frequency component has been frequency-modulated.

Under the above stated condition, the frequency allocation for frequency modulation and the azimuth angle range necessary in obtaining the S/N ratio required for the high frequency component YH are obtained as follows:

To better the conditions necessary against carrier cross-talk, the frequency allocation is preferably made as high as possible and the lower side band is arranged to be not too wide in such a way as to obtain a low carrier frequency. In other words, since the band of the high frequency component signal is 2 MHz, the frequency deviation is preferably held below 1 MHz. Therefore, the frequency allocation for the frequency modulation becomes as shown in FIG. 11. The S/N ratio obtained in this instance is computed in accordance with the following formula, which permits C/N-to-S/N conversion in close proximity:

$$S/N = \sqrt{3K} \cdot \frac{\Delta f}{f_{max}} \cdot C/N$$

In case that the width of the main head which is arranged to record the video signal of 0 to 4 MHz is 60 μm, the C/N of 10 KHz at the innermost peripheral part is 55 dB. Then, in the case of a head having an azimuth angle of a head gap the overlapping width of the signal track and the head gap becomes 4 μm in the worst case and, with the azimuth angle assumed to be $\phi$, the output level of the head decreases by $20 \log_{10} \cos \phi$. As for the allowable limit of the S/N ratio, since the signal to be handled is within a high frequency band where random noises are not conspicuous, the allowable value is set at 40 dB without weighting. Further, the value K is arranged to be 10 dB by means of the noise limiter, etc. and through a degree of emphasis. This arrangement gives a value of $\phi \lesssim 60°$. This value is in close proximity to the results of experiments.

The arrangement of the embodiment with respect to cross-talk between adjacent recording tracks is as follows: If any improvement in terms of visual sensation is not made by using carrier signals having interleaving relation with each other, as the carrier signals for effecting the FM modulation, the allowable limit to the carrier cross-talk between non-correlated signals is generally considered to be 30 to 34 dB. If carrier signals having interleaving relation with each other are used as the carrier signals for effecting the FM modulation, a reducing effect is obtained by about 10 dB in terms of visual sensations. In that event, the allowable limit to the cross-talk between adjacent tracks is 20 to 24 dB ("National Technical Report, 1975, 4-Hr VHS-VTR").
With the angle of the azimuth head gap assumed to be $\phi$, the amount of cross-talk occurring during azimuth recording is obtained from the following formula:

$$C/N = 20\log_{10}\left[(W-\Delta W)/\left\{\Delta W \cdot \cos\phi \cdot \frac{\left|\sin\left(\frac{2\pi \Delta W}{\lambda}\tan\frac{\phi}{2}\right)\right|}{\frac{2\pi \Delta W}{\lambda}\tan\frac{\phi}{2}}\right\}\right]$$

wherein
 C: carrier signal
 W: track width
 $\phi$: azimuth angle
 N: cross-talk carrier signal
 $\Delta W$: track deviation amount
 $\lambda$: wave length of recording signal.

In the above formula, the track width W is assumed to be 60 $\mu$m; and the maximum amount of track deviation $\Delta W$ to be 14 $\mu$m. As for the wave length of recording signal $\lambda$, with the maximum frequency 6.5 MHz assumed to be $\lambda$max when the outermost circumference $\gamma$ of the magnetic disc is 20 mm, the wave length of recording signal $\lambda$ can be expressed as follows:

$$\lambda\text{max} = \frac{20 \times 10^3 \times 2 \times 3.14 \times 60}{6.5 \times 10^6} \approx 1.16\ \mu m$$

Figure 13:
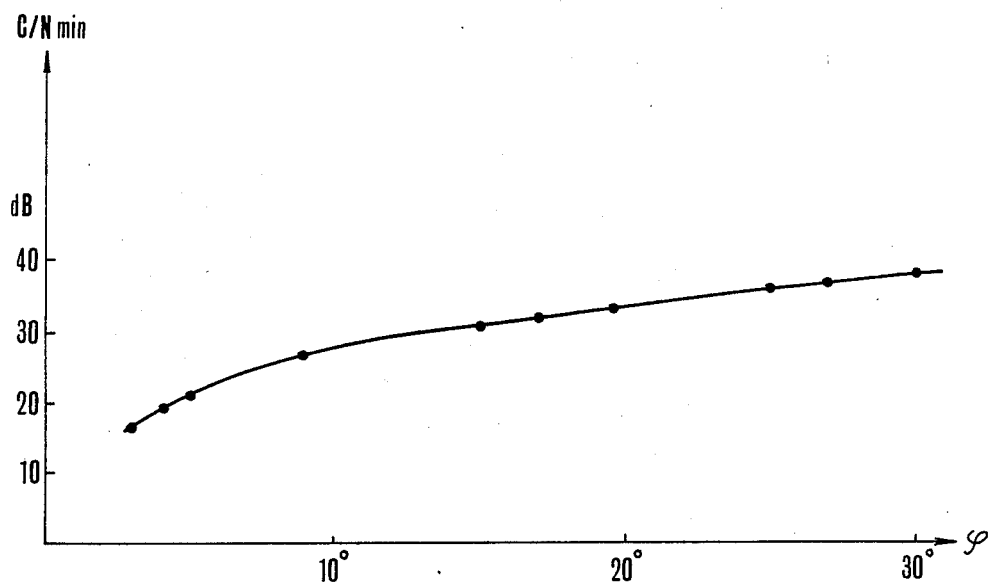
FIG. 13 illustrates a relation between an azimuth angle of a gap of a head $\phi$ and a minimum C/N value.
Figure 12:
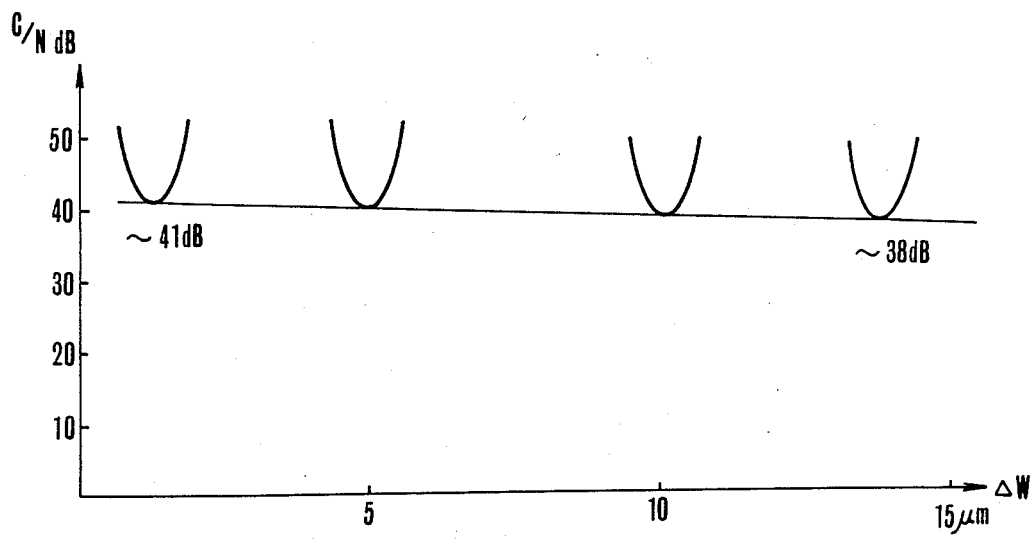
FIG. 12 illustrates a relation between a deviation of a head relative to a track on a magnetic disc and an amount of cross-talk produced when an azimuth angle of a gap of a head $\phi = 30°$.

FIG. 12 shows a relation between C/N (the amount of cross-talk in this case) and the amount of track deviation $\Delta W$ which is obtained when the azimuth angle $\phi$ is 30 degrees. FIG. 13 shows the azimuth angle $\phi$ in relation to the minimum value of C/N.

As apparent from the above, it is $10° \leq \phi$ from the point of cross-talk. This well coincides with the results of experiments. It is therefore apparent that the azimuth angle should be: $10° \leq \phi < 60°$. With the azimuth angle thus determined, the required accuracy of the azimuth angle must be obtained with regard to an azimuth loss L from the following formula:

$$\text{azimuth loss } L = 20\log\left[\frac{\frac{\pi W}{\lambda}\tan\phi}{\sin\left(\frac{\pi W}{\lambda}\tan\phi\right)}\right]$$

The result of computation according to the above formula shows that the allowable error range of the azimuth angle is about 0.3 degree.

Figure 6:
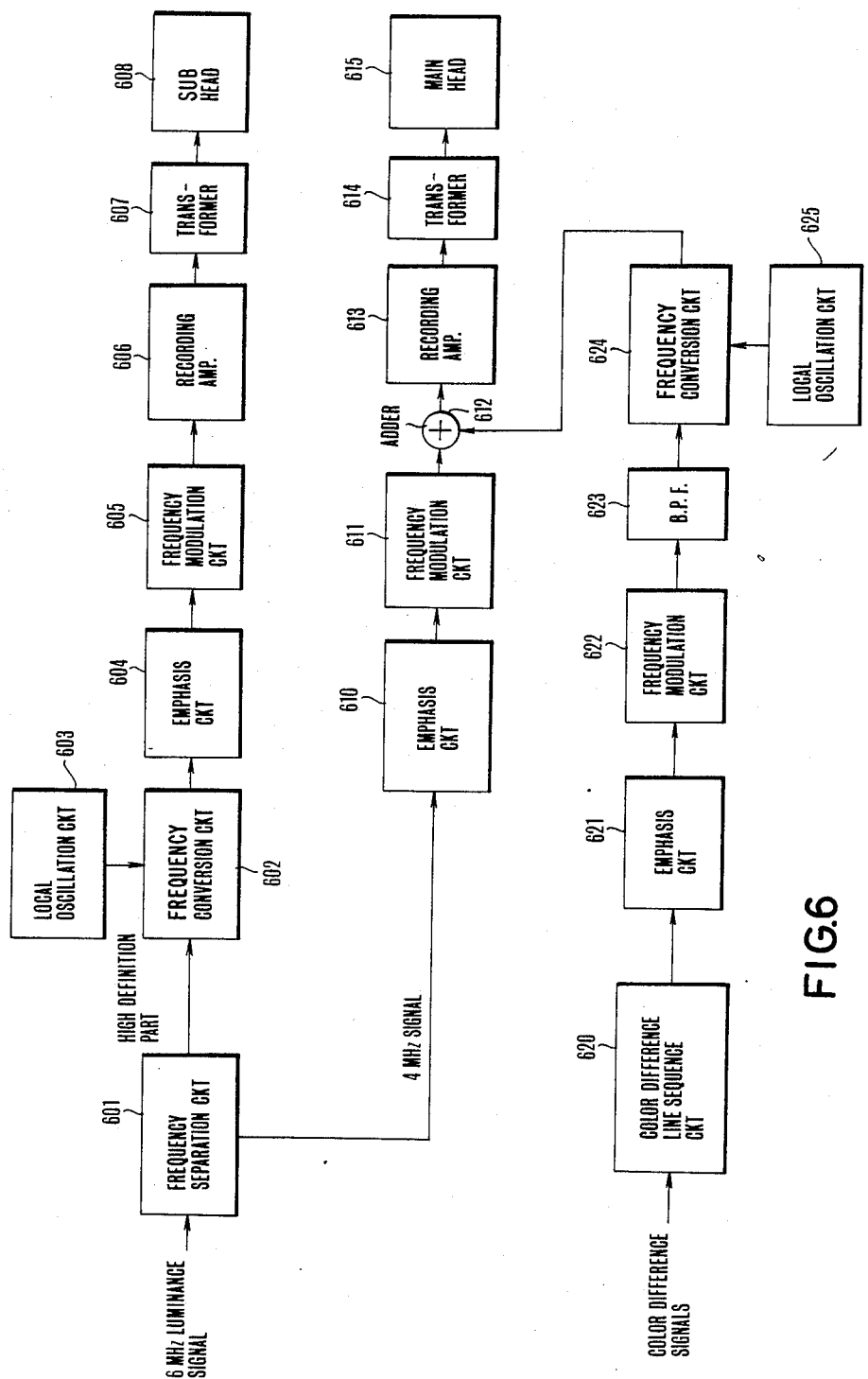
FIG. 6 is a block diagram showing the recording system of a magnetic recording/reproducing apparatus arranged according to this invention as a second embodiment thereof.

FIG. 6 shows in a block diagram the recording system of the magnetic recording/reproducing apparatus arranged as the second embodiment of the invention. The luminance signal which is of a frequency band up to 6 MHz is supplied to a frequency separation circuit 601 to be frequency divided at the frequency of 4 MHz as shown in FIG. 8. In actuality, the circuit 601 is arranged to frequency divide the input signal by means of an LPF and a BPF. Then, the high frequency component signal of a frequency band from 4 to 6 MHz thus obtained by frequency division is supplied to a frequency conversion circuit 602 to be converted into a signal of a low frequency band from 0 to 2 MHz or thereabout by using a signal of 3.58 MHz, etc. produced from a local oscillation circuit 603. Although it is omitted in FIG. 6, there is naturally provided an LPF for the purpose of shaping.

The signal produced from the frequency conversion circuit 602 is supplied to an emphasis circuit 604 to be subjected to a suitable emphasizing process, which is preferably arranged to give dynamic emphasis. The output of the circuit 604 is frequency modulated by a frequency modulation circuit 605. The output of the circuit 605 is current amplified by a recording amplifier 606. An amplified signal thus obtained is supplied via a step-up transformer 607 to a sub head 608. The head 608 then azimuth records the signal on a recording medium within a guard band part thereof.

Meanwhile, the signal of frequency band from 0 to 4 MHz obtained by the frequency separating circuit 601 and chrominance signals (color-difference signals) are frequency multiplexed through the same circuit arrangement as that of the conventional still video system before they are recorded by a main head 615 on the recording medium. More specifically, the signal of the frequencies 0 to 4 MHz from the frequency separating circuit 601 is supplied to an emphasis circuit 610 to undergo an emphasizing process. The output of the circuit 610 is frequency modulated by a frequency modulation circuit 611. The output of the circuit 611 is supplied to one of the input terminals of an adder 612. Further, the color difference signals are converted into a color difference line sequential signal by a color difference line sequence circuit 620. The output of the circuit 620 is subjected to an emphasizing process at an emphasis circuit 621. The output of the circuit 621 is supplied to a frequency modulation circuit 622. In this instance, if the color difference line sequential signal thus received is frequency modulated as it is, beating would be caused by aliasing noises. To avoid this, the frequency band modulation is performed at a high frequency. The signal thus frequency modulated is supplied via a BPF 623 to a frequency conversion circuit 624. The circuit 624 then converts this signal to a low frequency band by using a signal which is produced from a local oscillation circuit 625 and is, for example, at a frequency of 3.58 MHz. The output of the frequency conversion circuit 624 is supplied to the other input terminal of the adder 612. The adder 612 then frequency multiplexes the two input signals. The output of the adder 612 is current amplified by a recording amplifier 613. The output of the amplifier 613 is supplied via a step-up transformer 614 to the main head 615.

Figure 7:
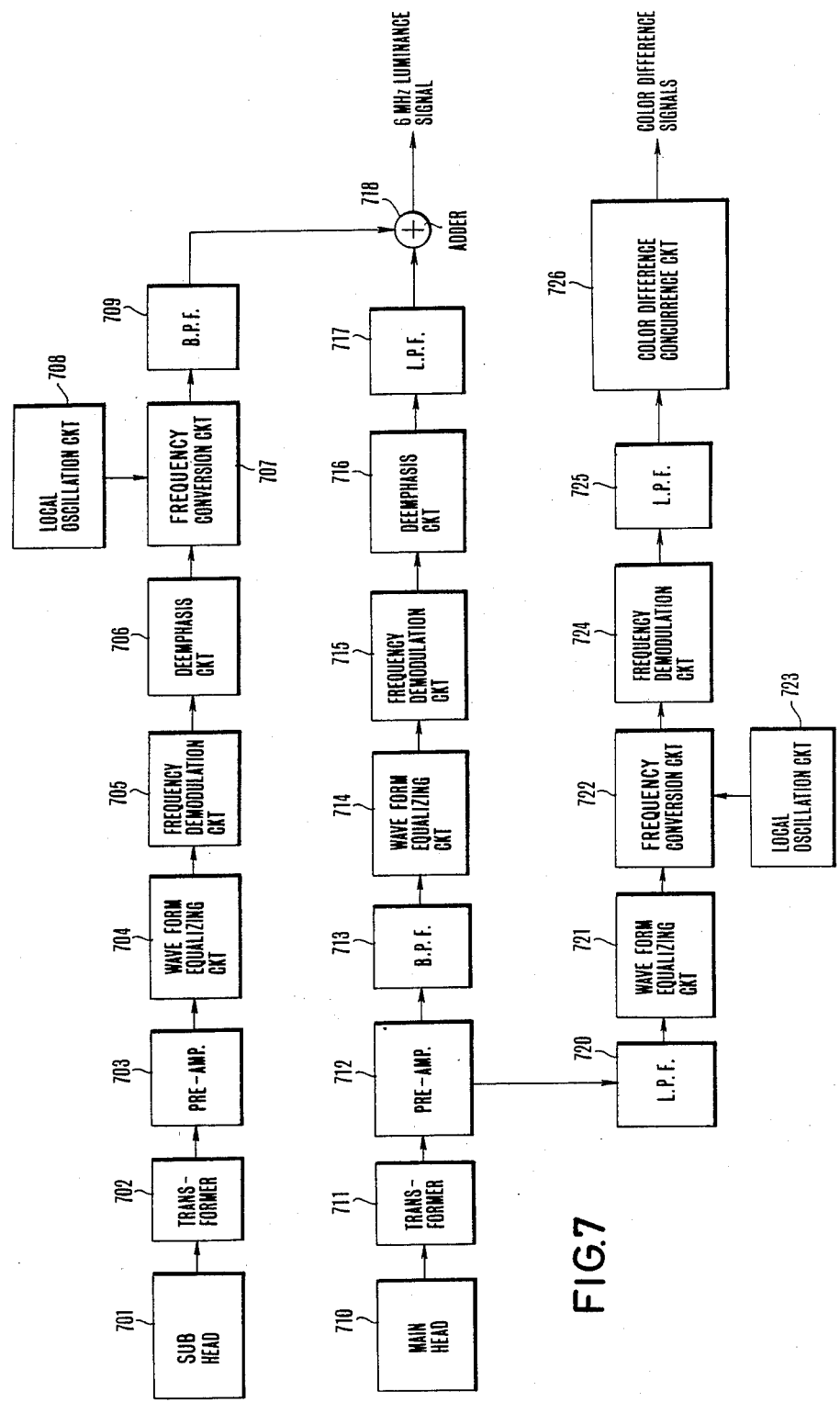
FIG. 7 is a block diagram showing the reproducing system of the second embodiment.

FIG. 7 shows in a block diagram the reproduction system of the magnetic recording/reproducing apparatus arranged as the second embodiment. A sub head 701 is arranged to detect a signal which is recorded in the guard band part of a recording medium (i.e. the high definition information component which is within a frequency band from 4 to 6 MHz and is included in a video signal). The signal which is thus taken out from the sub head 701 is supplied via a step-up transformer 702 to a preamplifier 703. After that, the signal has its wave form equalized by a wave form equalizing circuit 704. The output of the circuit 704 is frequency demodulated by a frequency demodulation circuit 705. The output of the circuit 705 is deemphasized by a deemphasis circuit 706. The output of the circuit 706 is supplied to a frequency conversion circuit 707 to have the frequency thereof raised through a beat-up process as much as the frequency value lowered by the recording system by using a signal produced from a local oscillation circuit 708. The output of the circuit 707 is supplied via a BPF 709 to one of the input terminals of an adder 718.

A main head 710 is arranged to detect a video signal (i.e. the signal component from 0 to 4 MHz) recorded on the recording medium. The signal from the main head 710 is processed by a step-up transformer 711 and a pre-amplifier 712. The output of the pre-amplifier 712 is divided into a luminance signal and a chrominance signal by means of a BPF 713 and an LPF 720. The luminance signal which is produced from the BPF 713 is processed by an ordinary demodulating system including a wave form equalizing circuit 714, a frequency demodulation circuit 715, a deemphasis circuit 716 and an LPF 717 to be thus made into a luminance signal of frequencies up to 4 MHz or thereabout. The luminance signal is then supplied to the other input terminal of the adder 718. The adder 718 then adds together the two inputs which are the signal of frequencies up to 4 MHz and the high frequency component signal of frequencies from 4 to 6 MHz. The adder thus produces a luminance signal of the original frequency band of 6 MHz which was obtained at the time of recordeding on the recording medium.

The chrominance signal which is produced from an LPF 720 is supplied to a wave form equalizing circuit 721 to have its wave form equalized. To prevent occurrence of moire due to aliasing noises produced at a demodulating part, a frequency conversion circuit 722 is arranged to raise the frequency of the output of the wave form equalizing circuit 721 by using a signal of a frequency of 3.58 MHz or thereabout produced from a local oscillation circuit 723. After this, the chrominance signal is frequency demodulated by a frequency demodulation circuit 724. The output of the demodulation circuit 724 is supplied via an LPF 725 to a color difference concurrence circuit 726 to be subjected to an interpolating process. The circuit 726 thus converts this input signal into concurrent color difference signals. The reproducing system thus produces the color difference signal along with the luminance signal of 6 MHz.

This invention is not limited to a still video system but is also applicable to any other system having a guard band on the recording medium. While the second embodiment is fundamentally arranged to be capable of recording high frequency component as described in the foregoing if there is high frequency component, the embodiment is compatible with a system of the kind having no high frequency component.

Furthermore, in the case where at the time of recording the video signal is FM-modulated and then recorded, while at the time of reproduction the signal is reproduced from the recording medium and then FM-demodulated and where the carrier signals having interleaving relation with each other are used as the carrier signals for effecting the FM-modulation and the FM-demodulation, the second embodiment operates as follows:

The process in which the carrier signals having interleaving relation with each other are used as the carrier signals for effecting the FM-modulation of the video signal is employed for the purpose of bringing cross-talks into a line offset relation. By this, cross-talks can be mitigated in terms of visual sensation. Generally, this process can be carried out by arranging the following relation to obtain between the carrier fc(m) of an m-th field and the carrier fc(m+1) of an m+1-th field:

$$\Delta fc = fc(m) - fc(m+1) = \frac{2n-1}{2} fH$$

(wherein n: an integer and fH: horizontal scanning frequency)

In another method of carrying out this process, the phase of the carrier is inverted for every filed (the line offset state is obtainable by interleave scanning). The term "cross-talks" means an azimuth signal in relation to a main track signal and the main signal in relation to the azimuth signal.

Figure 14:
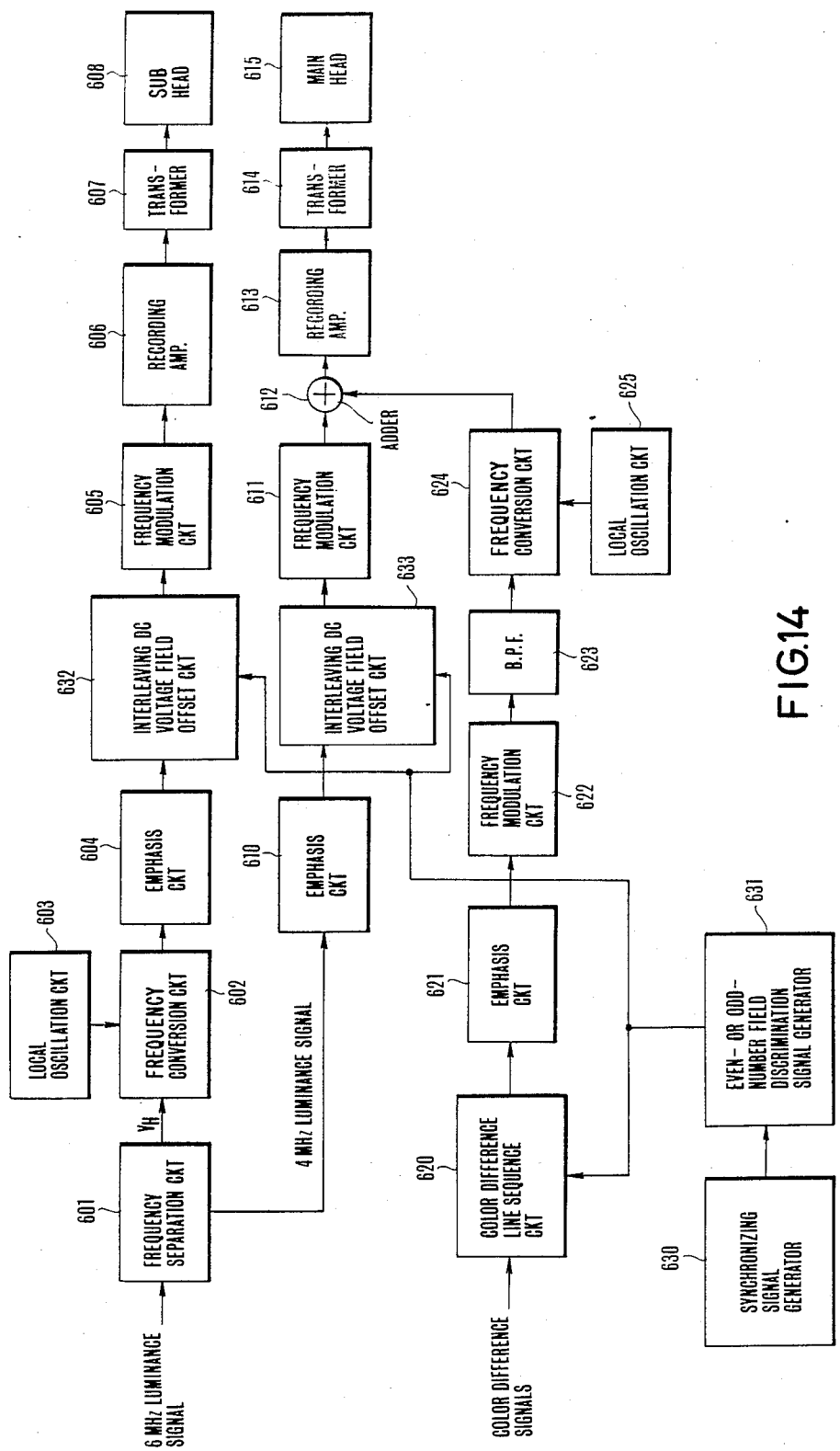
FIG. 14 is a block diagram showing the recording system of a magnetic recording/reproducing apparatus arranged as a third embodiment of the invention.

FIG. 14 shows in a block diagram the recording system of a magnetic recording/reproducing apparatus which is arranged as a third embodiment of this invention. In FIG. 14, the parts which are the same as those of FIGS. 1 to 13 are indicated by the same reference numerals. A luminance signal of frequencies up to 6 MHz is supplied to a frequency separating circuit 601 which frequency divides it into two at a frequency of 4 MHz as shown in FIG. 8. In actuality, the circuit 601 performs this frequency division by means of an LPF and a BPF. A high frequency component signal which is thus separated and is within a frequency band from 4 to 6 MHz is frequency converted to a signal of frequencies between 0 to 2 MHz by a frequency conversion circuit 602 which uses a signal produced by a local oscillation circuit 603 at a frequency of, for example, 3.58 MHz. Although it is not shown in FIG. 14, an LPF is provided for the purpose of shaping in this instance. The signal thus obtained from the frequency conversion circuit 602 is supplied to an emphasis circuit 604. The circuit 604 performs a suitable emphasizing process (preferably dynamic emphasis) on the signal. The output of the emphasis circuit 604 is supplied to an interleaving DC voltage field offset circuit 632. The circuit 632 then gives a DC potential difference for every field as much as a value $\Delta v$ which can be expressed as follows:

$$\Delta v \times \beta = fH/2$$

(wherein $\beta$ represents the control sensitivity of a frequency modulator.)

The reason for such an offset: For accurate recording or reproduction, the signal must be decided to be for an odd-number or even-number field. A discrimination is thus made between an odd-number field and an even-number field by means of a signal from an even- or odd-number field discriminating signal generator 631.

The signal which is thus processed by the interleaving DC voltage filed offset circuit 632 is supplied to a frequency modulation circuit 605 to be frequency modulated there. The output of the circuit 605 is current amplified by a recording amplifier 606. The amplified signal is supplied via a step-up transformer 607 to a sub head 608. The head 608 azimuth records the signal within a guard band part of a recording medium.

In the meantime, another signal of frequencies from 0 to 4 MHz which is separated by the frequency separation circuit 601 and chrominance signals (or color difference signals) are frequency multiplexed by exactly the same circuit arrangement as the conventional still video system. The multiplexed signals are then recorded on the recording medium by a main head 615.

More specifically, the signal of frequencies 0 to 4 MHz from the frequency separation circuit 601 is subjected to an emphasis process carried out by an emphasis circuit 610. The signal is then supplied to an interleaving DC voltage field offset circuit 633. Then, like the above stated offset circuit 632, the circuit 633 gives a DC potential difference to the signal for every field on the basis of a signal generated by the even- or odd-number filed discrimination signal generator 631. The signal which is thus processed by the circuit 633 is frequency modulated by a frequency modulation circuit 611. The frequency modulated signal is then supplied to one of two input terminals of an adder 612. Meanwhile, the color difference signals are supplied to a color difference line sequence circuit 620 to become a color difference line sequential signal on the basis of a signal produced from the above stated discrimination signal generator 631. Following that, the color difference line sequential signal is subjected to an emphasis process at an emphasis circuit 621. The output of the circuit 621 is supplied to a frequency modulation circuit 622. At the circuit 622, if the input color difference line sequential signal is frequency modulated as it is, beating would be caused by an aliasing noise. To avoid this, the frequency modulation is carried out at a high frequency band. The frequency modulated signal thus produced from the circuit 622 is supplied via an BPF 623 to a frequency conversion circuit 624 to be converted to a lower band with a signal of, say, 3.58 MHz which is produced from a local oscillation circuit 625. The output of the circuit 624 is supplied to the other input terminal of the adder 612.

The adder 612 then frequency multiplexes the two input signals thereof. The output of the adder 612 is current amplified by a recording amplifier 613 and is supplied via a step-up transformer 614 to a main head 615.

Figure 15:
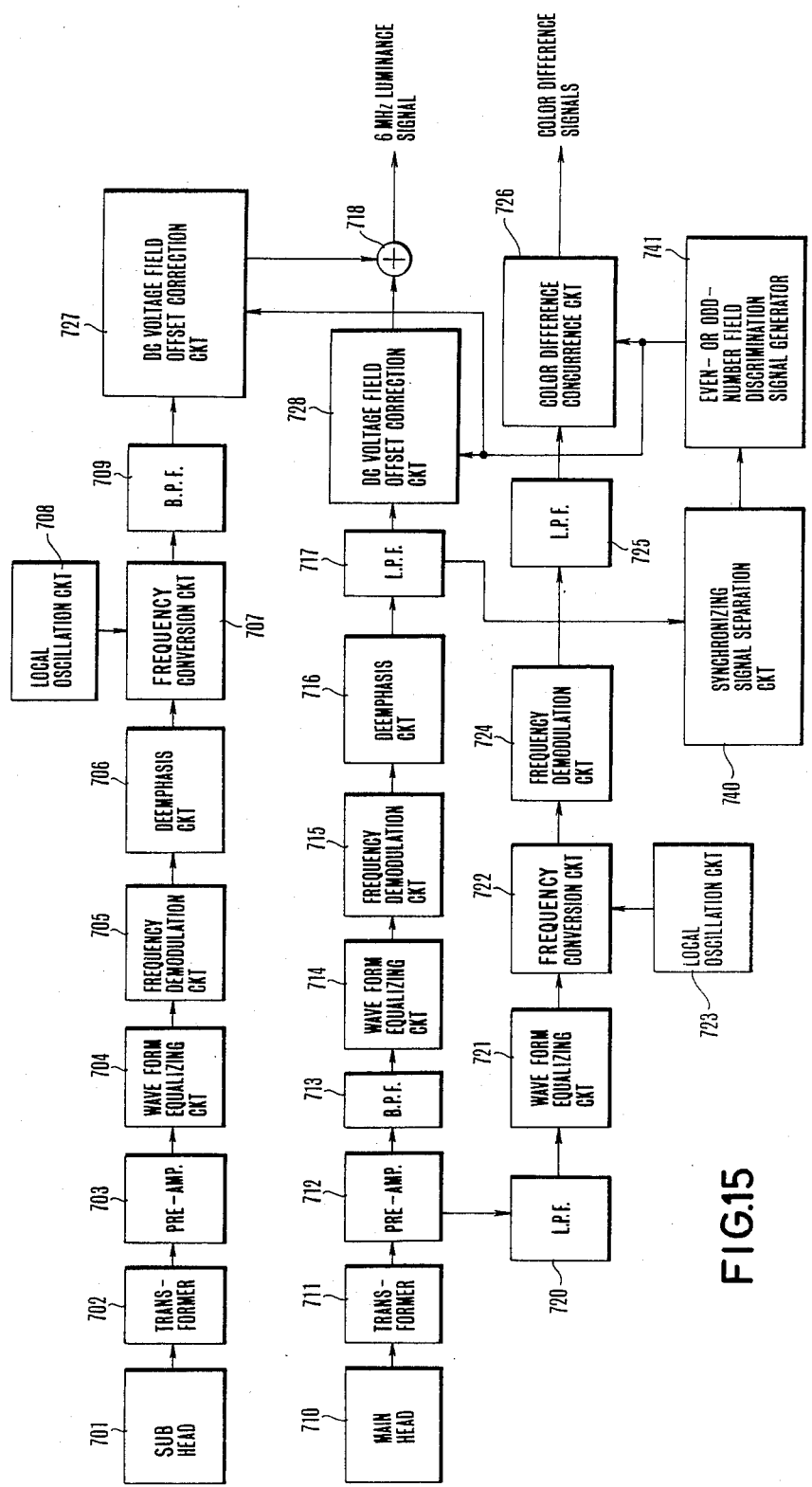
FIG. 15 is a block diagram showing the reproducing system of the same embodiment.

FIG. 15 shows in a block diagram the reproducing system of the magnetic recording/reproducing apparatus which is the third embodiment of this invention. A sub head 701 is arranged to detect a signal which is a high frequency component having frequencies between 4 and 6 MHz in a video signal and is recorded within the guard band part of a recording medium. The signal thus detected is taken out from the sub head 701 and is supplied via a step-up transformer 702 to a pre-amplifier 703. The output of the pre-amplifier 703 is supplied to a wave form equalizing circuit 704 to have the wave form thereof equalized there. The output of the circuit 704 is supplied to a frequency demodulation circuit 705 to be frequency demodulated there. The demodulated signal is then subjected to a deemphasis process which is carried out by a deemphasis circuit 706. The output of the circuit 706 is supplied to a frequency conversion circuit 707 to be frequency converted upward through a beat-up process carried out with a signal from a local oscillation circuit 708 as much as a frequency value decreased by the recording system. The signal which is thus high frequency band converted is supplied via a BPF 709 to a DC voltage field offset correction circuit 727. Since the signal has been offset as much as Δv for every horizontal scanning period (1 H) by an interleave process carried out in the recording system, the circuit 727 corrects this offset on the basis of a discriminating signal produced from an even- or odd-number field discriminating signal generator 741. The output of the circuit 727 is supplied to one of the intput terminals of an adder 718.

A main head 710 is arranged to detect the video signal (i.e. a frequency component of a frequency band from 0 to 4 MHz) which is recorded on the recording medium. The output signal of the main head 710 is processed by a step-up transformer 711 and a pre-amplifier 712. Following that, the signal from the main head 710 is divided into a luminance signal and a chrominance signal through a BPF 713 and an LPF 720. The luminance signal from the BPF 713 is processed into a luminance signal of frequencies up to 4 MHz through an ordinary demodulating system consisting of a wave form equalizing circuit 714, a frequency demodulation circuit 715, a deemphasis circuit 716, an LPF 717 and a DC voltage filed offset correction circuit 728 which is similar to the above stated circuit 727. The luminance signal thus processed is supplied to the other input terminal of the above stated adder 718. The adder 718 adds together this signal of frequencies up to 4 MHz and the above stated high frequency component signal of a frequency band from 4 to 6 MHz to obtain thereby the original luminance signal of 6 MHz recorded on the recording medium.

The chrominance signal from the 720 is supplied to a wave form equalizing circuit 721 to have its wave form equalized there. The chrominance signal thus processed by the circuit 721 is frequency demodulated by a frequency demodulation circuit 724 after the frequency of the signal is raised through a frequency conversion circuit 722 by using a signal of 3.58 MHz or the like produced from a local oscillation circuit 723 for the purpose of preventing moire from occurring due to aliasing at the demodulating part. The signal thus demodulated is supplied via an LPF 725 to a color difference concurrence circuit 726 to be converted into concurrent color difference signals through a suitable interpolating process carried out on the basis of a signal produced from the even- or odd-number field discrimination signal generator 741. The original luminance signal of 6 MHz is thus obtained together with color difference signals.

Next, a fourth embodiment of this invention is described as follows: A feature of the fourth embodiment resides in that: Since the high frequency component signal has some allowance for the S/N ratio thereof, the crosstalk to the main signal A (having frequencies from 0 to 4 MHz) is lowered by recording the high frequency component signal on a recording medium by lowering the level thereof. The interleaving process is not applied to the main signal but is applied only to the high frequency component signal which tends to cause a crosstalk.

Figure 16:
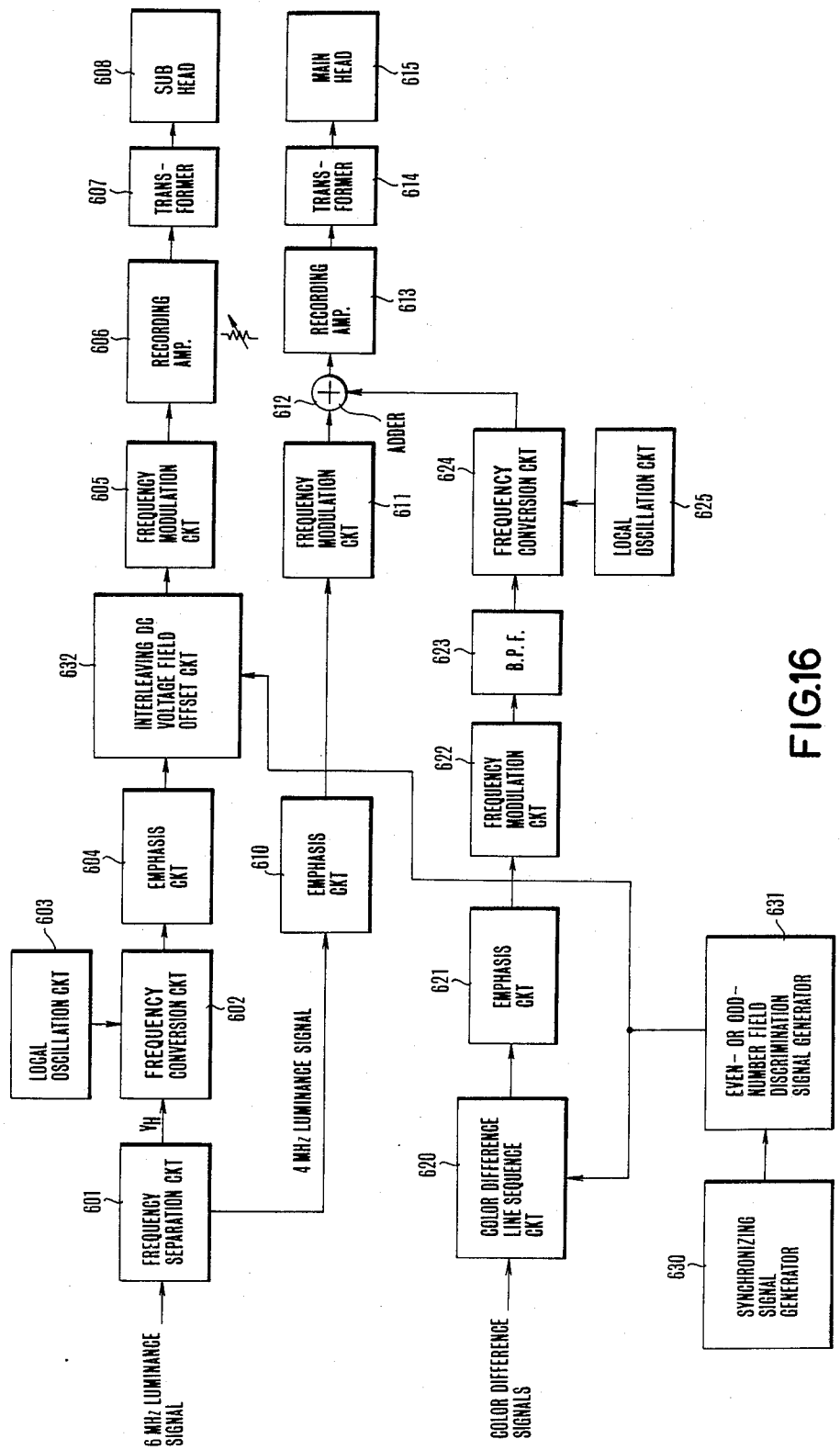
FIG. 16 is a block diagram showing the recording system of a magnetic recording/reproducing apparatus arranged according to the invention as a fourth embodiment thereof.

FIG. 16 shows in a block diagram the recording system of a magnetic recording/reproducing apparatus which is arranged as the fourth embodiment of this invention. In this case, a DC voltage field offset circuit 632 for interleaving is provided only in a high frequency component signal processing system for making use of carrier signals having interleaving relation with each other as the carrier signals for effecting the FM modulation. The rest of the arrangement of the recording system of the fourth embodiment is identical with that of the third embodiment described in the foregoing except that: By adjusting (lowering) the amplification of the recording amplifier 606, the high frequency component signal is recorded at a lowered level in the guard band part of a recording medium.

Figure 17:
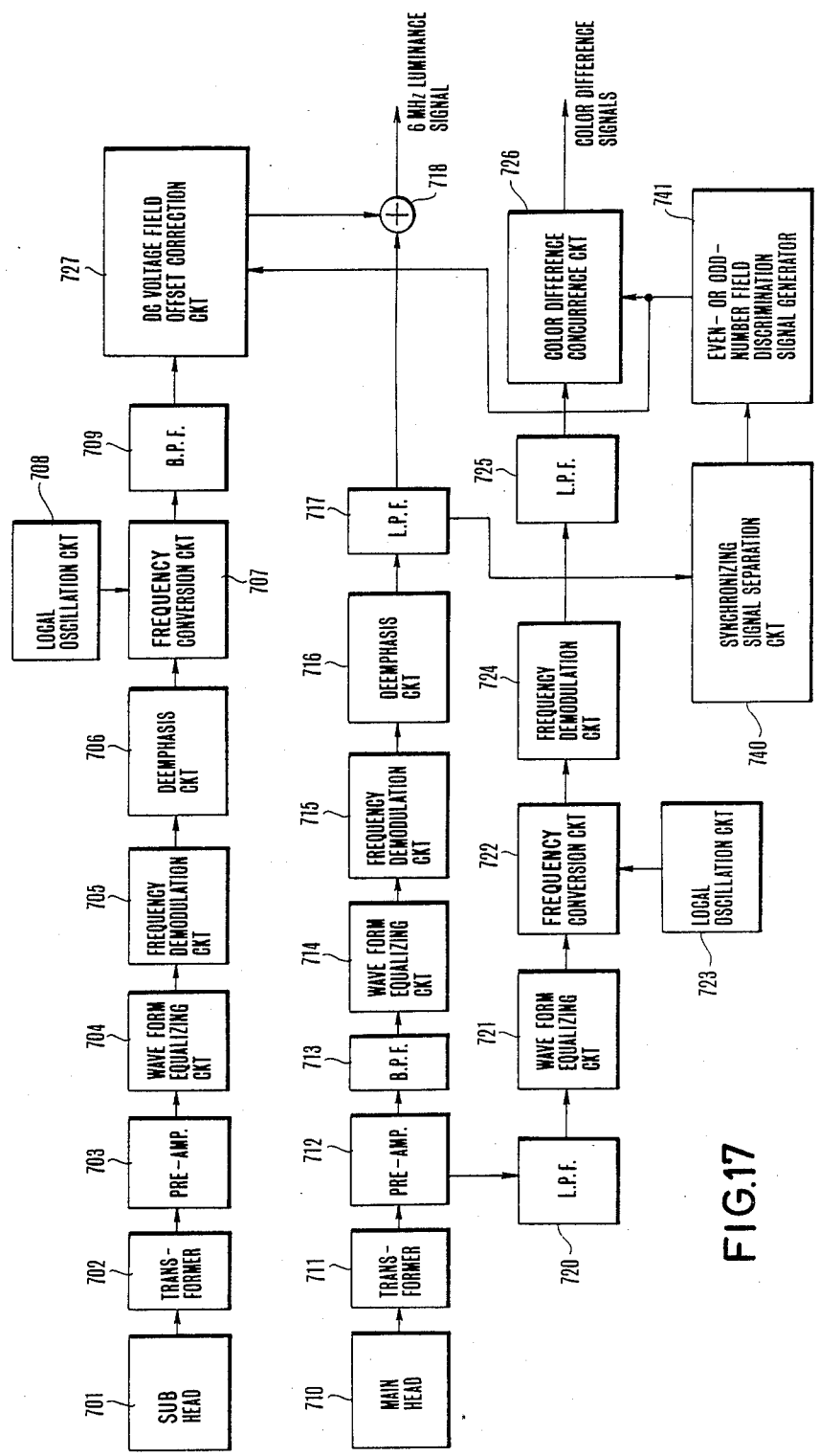
FIG. 17 is a block diagram showing the reproducing system of the same embodiment.

FIG. 17 shows in a diagram the reproducing system of the fourth embodiment. Like in the recording system, a DC voltage field offset correction circuit 727 is provided only in a high frequency component signal processing system. The rest of arrangement of the reproducing system is identical with that of the third embodiment. The fourth embodiment is fundamentally applicable not only to a still video system but also to any other system that is arranged to have a guard band part on the recording medium.

In the above described embodiment, it is assumed that the video signal is processed by interlace scanning process, and in case where the carrier signals having interleaving relation with each other are used as the carrier signals for the FM-modulation the carrier signals are changed in every field period. However, it is possible to change the carrier signals in every horizontal scanning period.

If it is assumed, for example, that the video signal is processed by non-interlace scanning process, it is required to change the carrier signals in every horizontal scanning period in the case where the carrier signals having interleaving relation are used as the carrier signals for the FM-modulation.

The fourth embodiment of this invention is not only capable of recording high frequency component as described in the foregoing but also has interchangeability with a system of the kind handling no high frequency component.

I claim:

1. An information signal recording apparatus for recording an information signal having a predetermined frequency band on a magnetic recording medium, comprising:
    (a) signal separating means for receiving said information signal and for separating the received information signal into a first signal having a first frequency band and a second signal having a second frequency band which is higher than said first frequency band and outputting said first and second signals;
    (b) first recording means having a first magnetic head to record the first signal outputted from said signal separating means onto a first area of said magnetic recording medium by said first magnetic head; and
    (c) second recording means having a second magnetic head, which is different in its azimuth angle of gap from said first magnetic head, to record the second signal outputted from said signal separating means onto a second area of said magnetic recording medium, which is different from said first area.

2. An apparatus according to claim 1, wherein said second magnetic head is so arranged that its azimuth angle of gap is 30°-60°.

3. An apparatus according to claim 1, wherein said second recording means is arranged to form a signal recorded track having a width of 24-40 μm, by recording said second signal onto the second area of said magnetic recording medium.

4. An information signal recording apparatus for recording an information signal having a predetermined frequency band onto a recording medium, comprising:
    (a) signal separating means for receiving said information signal and for separating the received information signal into a first signal having a first frequency band and a second signal having a second frequency band which is higher than said first frequency band and outputting said first and second signals;
    (b) first recording means for forming a frequency-modulated first signal by frequency-modulating the first signal outputted from said signal separating means and for recording said frequency-modulated first signal onto a first area of said recording medium; and
    (c) second recording means for forming a frequency-modulated second signal, which is interleaved relatively to said frequency-modulated first signal, by frequency-modulating the second signal outputted from said signal separating means and for recording said frequency-modulated second signal onto a second area of said recording medium which is different from said first area.

5. An apparatus according to claim 4, wherein said recording medium includes a magnetic recording medium, and said second recording means includes a magnetic head having an azimuth angle of gap of 4°-60° and is arranged to record the said frequency-modulated second signal onto the second area of said magnetic recording medium by said magnetic head.

6. An apparatus according to claim 4, wherein said second recording means has a recording head and is arranged to form a signal recorded track having a width of 24-40 m, by recording said frequency-modulated second signal onto the second area of said recording medium.

7. An information signal recording apparatus for recording a first information signal having a predetermined frequency band and a second information signal having a frequency band which is higher than the frequency band of said first information signal, onto a magnetic recording medium, comprising:
    (a) signal separating means for receiving said second information signal and for separating the received second information signal into a first signal having a frequency band which is same as that of said first information signal and a second signal having a frequency band which is higher than that of said first information signal and outputting said first and second signals;
    (b) first recording means having a first magnetic head to record said first information signal or said first signal outputted from said signal separating means onto a first area of said magnetic recording medium by said magnetic head; and
    (c) second recording means having a second magnetic head, which is different in azimuth angle of gap from said first magnetic head, to record the second signal outputted from said signal separating means onto a second area of said magnetic recording medium, which is different from the first area, by said second magnetic head.

8. An apparatus according to claim 7, wherein said magnetic recording medium includes a magnetic disc, which is so arranged that concentric first areas are formed at predetermined distances on said magnetic disc and second areas are formed between said first areas.

9. An apparatus according to claim 7, wherein said first information signal includes an image signal and said second information signal includes a high definition image signal having a higher resolution than that of said image signal.

10. An information signal recording apparatus for recording a first information signal having a predetermined frequency band and a second information signal having a frequency band which is higher than the frequency band of said first information signal, onto a recording medium, comprising:
    (a) signal separating means for receiving said second information signal and for separating the received second information signal into a first signal having a frequency band which is same as that of said first information signal and a second signal having a frequency band which is higher than that of said first information signal and outputting said first and second signals;

(b) first recording means for forming a first frequency-modulated signal by frequency-modulating said first information signal or said first signal outputted from said signal separating means and for recording said first frequency-modulated signal onto a first area of said recording medium; and (c) second recording means for forming a frequency-modulated second signal, which is interleaved relatively to said frequency-modulated first signal, by frequency-modulating the second signal outputted from said signal separating means and for recording said frequency-modulated second signal onto a second area of said recording medium which is different from said first area.

11. An apparatus according to claim 10, wherein said recording medium includes a magnetic disc.

12. An apparatus according to claim 11, wherein said magnetic disc is so arranged that concentric first areas are formed at predetermined distances on said magnetic disc and second areas are formed between said first areas.

13. An apparatus according to claim 11, wherein said first recording means includes a first magnetic head and is arranged to record said first frequency-modulated signal onto a first area of said magnetic disc by said first magnetic head, and said second recording means includes a second magnetic head, which is different in azimuth angle of gap from said first magnetic head and is arranged to record said second frequency-modulated signal onto a second area of said magnetic disc by said second magnetic head.

14. An apparatus according to claim 10, wherein said first information signal includes an image signal and said second information signal includes a high definition image signal having a higher resolution than that of said image signal.

* * * * *